Nov. 2, 1948.  R. L'HERMITE  2,453,023
MACHINE FOR TESTING MATERIALS CONSTRAINED
TO ALTERNATE FLEXURE
Filed March 3, 1945  4 Sheets-Sheet 1

INVENTOR.
ROBERT L'HERMITE.
by Haseltine Lake & Co.
ATTORNEYS.

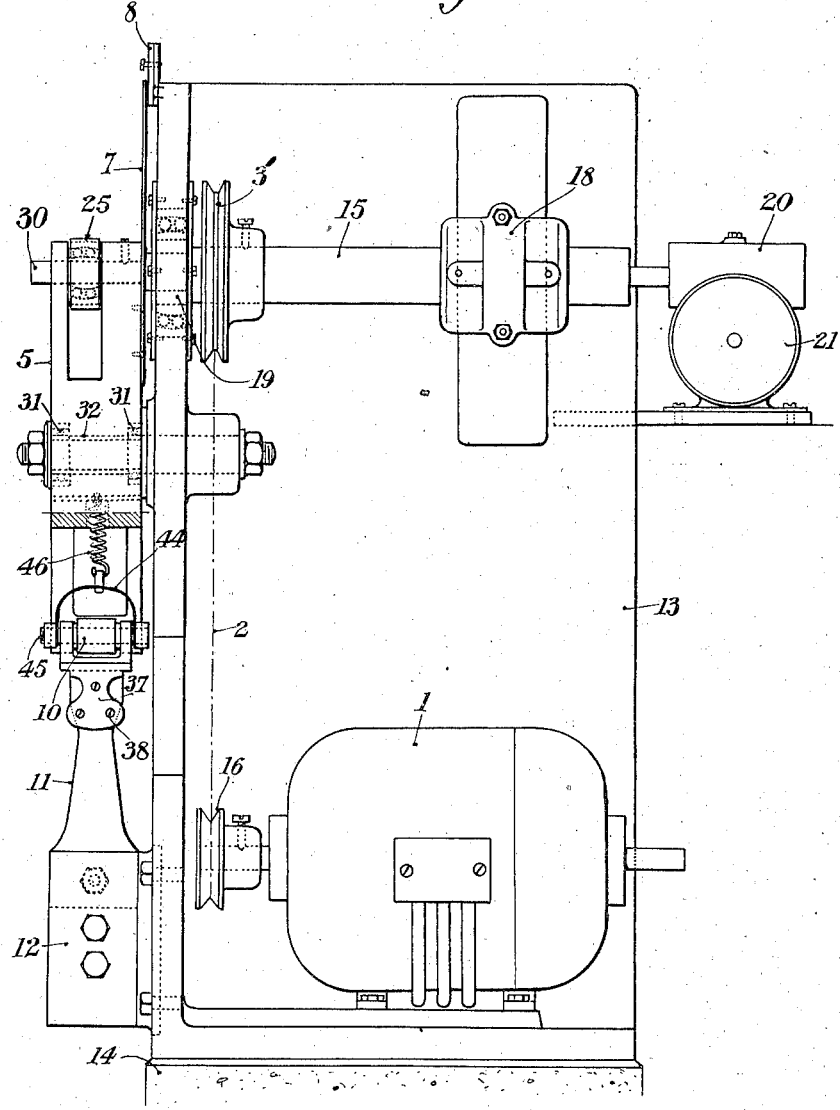

Nov. 2, 1948.                R. L'HERMITE                2,453,023
              MACHINE FOR TESTING MATERIALS CONSTRAINED
                         TO ALTERNATE FLEXURE
Filed March 3, 1945                              4 Sheets-Sheet 4

INVENTOR.
ROBERT L'HERMITE.
by Hazeltine Lake Co.
    ATTORNEYS.

Patented Nov. 2, 1948

2,453,023

UNITED STATES PATENT OFFICE 2,453,023

MACHINE FOR TESTING MATERIALS CONSTRAINED TO ALTERNATE FLEXURE

Robert L'Hermite, Clermont-Ferrand, France, assignor to Fondation dite: Groupement Francais Pour Le Developpement des Recherches Aeronautiques, Clermont-Ferrand, France Application March 3, 1945, Serial No. 580,773
In France May 22, 1942

Section 1, Public Law 690, August 8, 1946
Patent expires May 22, 1962

4 Claims. (Cl. 73—100)

The present invention has for object a machine for testing materials constrained to alternate flexure, allowing to impart to a test-piece of suitable shape, either periodical distortions of sinusoidal aspect, symmetrical relatively to a mean position which can be, or not, the position of rest, or more complex distortions resulting from the superposition of two or more sinusoidal movements of any periods whatever.

In tests by alternate flexure, it is advantageous in fact to be able to study the comportment of the material under variable attractions without necessarily the stresses exerted in one direction be equal to the stresses exerted in the other. But it is also advantageous to be able to subject the material to stresses which follow a more complicated law. Those to which the members are subjected in reality, often result in fact from the superposition of several attractions of various nature and periods, and it is not obvious that the limit of fatigue of the material is the same when it is subjected to stresses which vary according to different laws. In particular it may be asked what is the limit of fatigue of a material subjected to the action of normal uniform stresses to which are spasmodically added abnormal overloads.

When, at the head of a test-piece the foot of which is firmly embedded, stresses of variable amplitude are applied, said head deviates more or less from its initial position. If the limits of resiliency of the material tested are not departed from, at least as long as cracks of fatigue are not produced at the surface of the test-piece the shape of the test-piece can be so chosen that the amount of deviation assumed by the head of the latter is proportional to the amplitude of the stress applied. Based on this remark, the machine according to the invention allows of subjecting a test-piece of the material to be tested to alternate flexures according to a simple or complex law and of adjusting the amplitude of the deviations assumed by the head of the test-piece during said flexures so that they correspond to the amplitude of the stresses (average stresses and extreme stresses) to which it is desired to subject said test-piece.

Said machine is therefore devised to allow of adjusting with very great accuracy the deviations it imparts to the head of the test-piece to be tried, and of comparing said deviations with the stresses to which they correspond.

If it is sufficient to obtain a machine allowing to subject the test-piece to alternate distortions according to a simple sinusoidal law, the machine can be reduced to the following elements: in addition to the jaws for firmly embedding one of the ends of the test-piece, the machine comprises a motor allowing to cause the rotation of a crank-plate of adjustable eccentricity, a connecting-rod also of adjustable length transmitting the movement from the crank-handle to a beam oscillating about an axis parallel to the axis of flexure of the test-piece and subjecting the head of the latter to reciprocating displacements of definite amplitudes. It also comprises measuring apparatus for determining the amplitude of the displacement of the free end of the test-piece, to compare it with that of the displacement caused by a stress of given intensity, devices for avoiding that the test-piece be subjected to stresses other than those the effects of which are to be studied, to stop the apparatus as soon as the test-piece breaks, etc.

If on the contrary, it is desired to subject the test-piece to distortions according to more complicated laws, the apparatus is modified in order to be able to impart thereto supplementary movements which are superposed to the preceding one; it is thus that a second crank-plate can be provided acting on a connecting-rod of adjustable length, at the end of which is mounted the spindle of the beam as will be explained hereinafter in greater detail; use can also be made of the single crank-plate of the simple machine by adjoining thereto a device causing its eccentricity to vary during the operation.

The accompanying drawing shows by way of indicating example and not in a limiting sense an embodiment of the present invention.

Figs. 2 and 3 show respectively in front view and side view with parts broken away, a machine according to the invention.

Figure 1:
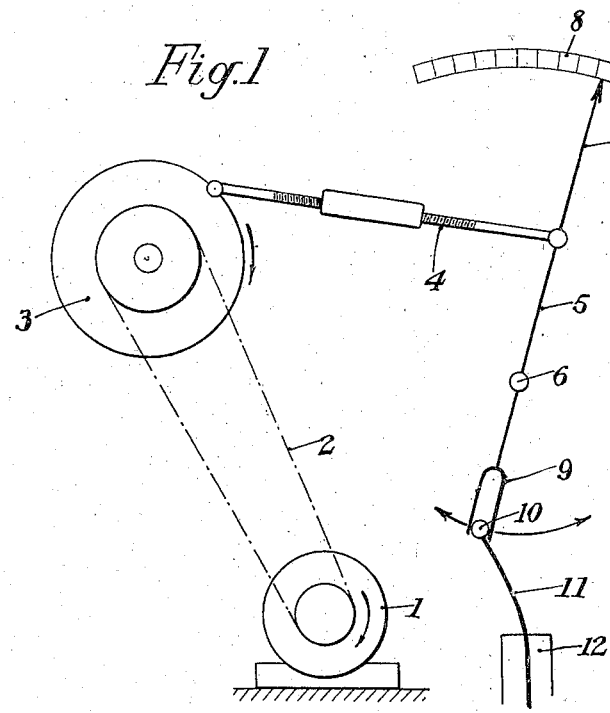
Fig. 1 is a diagram of the principle.

The electric motor 1 drives by means of the belt 2 the crank-plate 3. The connecting-rod 4 connects said crank-plate 3 to the beam 5 oscillating about the horizontal pivot 6; the upper end of the beam terminates in an index 7 moving in front of a graduation 8; the lower end thereof terminates in a fork-member 9 in which is engaged a roller 10, secured at the head of the test-piece 11, the foot of which is firmly embedded at 12. If the eccentricity of the crank-plate 3 and the length of connecting-rod 4 are suitably adjusted, the head of the test-piece is subjected to displacements of definite amplitude, and equal on either side of its position of equilibrium, but the eccentricity and length of the connecting-rod can also be acted upon so that the mean position of the test-piece corresponds to such a stress which has been fixed beforehand.

Figure 2:
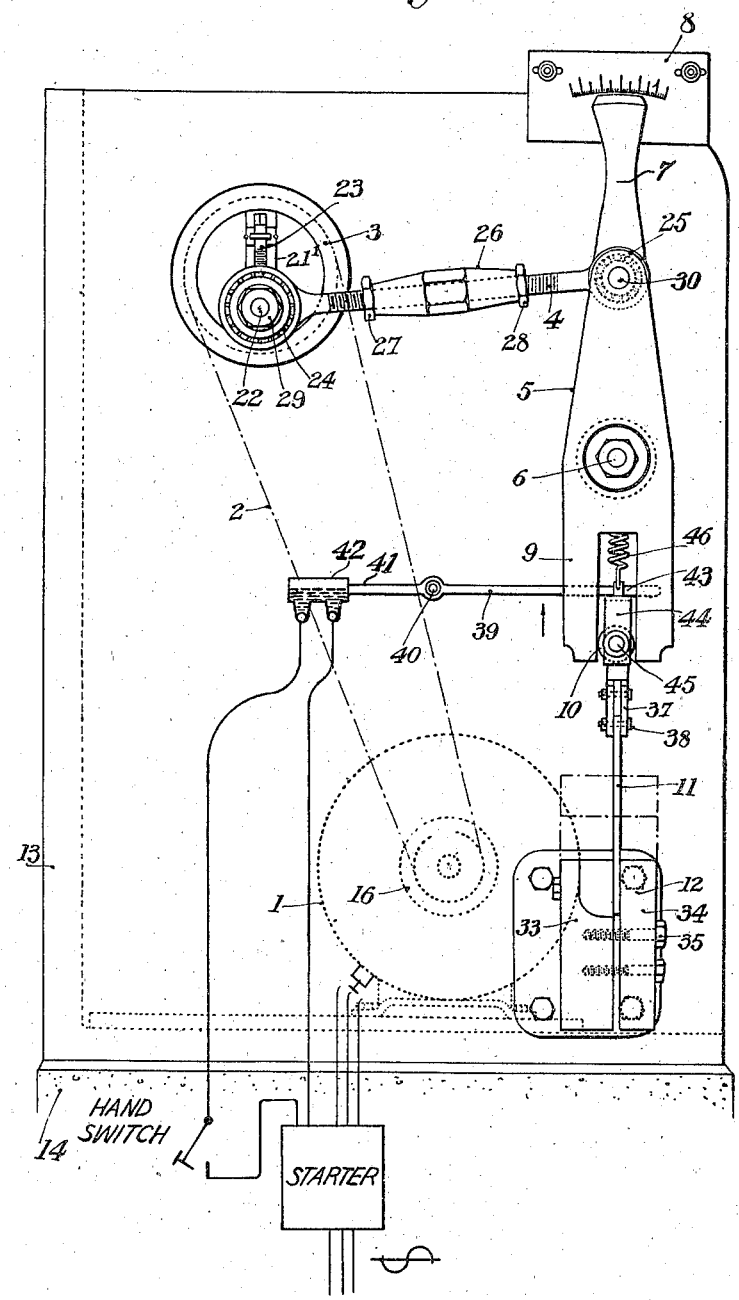

The machine illustrated in Figs. 2 and 3 is mounted on a cast-iron frame 13 secured on a base 14. The electric motor 1 transmits its movements to the shaft 15 by means of the belt 2 engaged on pulleys 16 and 3'. The shaft 15 is supported, on the one hand, by a fixed bearing 18 secured on the frame, one the other hand by a ball-bearing 19 embedded also in the frame.

The end of shaft 15 on the side of the bearing is connected to a speed reducing device 20 connected to the revolution counter 21.

The other end of said shaft carries outside the frame a crank-plate 3, provided, according to one of its diameters, with a dove-tail groove $21^1$. The spindle of the eccentric 22 is mounted on a slide-block which engages in aid groove. The eccentricity is adjusted by means of a screw 23 the axis of which is parallel to groove $21^1$ and the square head of which is held in a housing rigid with the plate.

The connecting-rod 4 is constituted by two screw-threaded rods of reverse pitch. Each is terminated by a circular cage 24, 25 containing the ball-bearing of the corresponding spindle. These two screw-threaded rods screw in one and the same sleeve 26 held in position by two lock-nuts 27, 28.

One of the ball-bearings is mounted on the spindle of the eccentric 22 and is clamped by means of a nut 29, the other is mounted on the spindle 30 carried by the beam 5.

The beam is a steel member hollowed out at the lower and upper parts thereof. It is mounted on ball-bearings 31 and oscillates about a horizontal pivot 6 secured on the frame.

The upper part of the beam carries the spindle 30 of the connecting-rod; the lower part is divided into two branches to form a fork-piece 9 and receive the roller 10 of the head of the test-piece 11. A brass index 7 forming sliding-gauge is moreover secured at the upper part of the beam; its deviation is read relatively to a graduated plate 8.

The test-piece is clamped in jaws 12 constituted by two blocks one of which 33 is fixed and rigid with the frame 13, the other 34 is secured on the first one by means of three clamping screws 35, one of which ensures at the same time the satisfactory positioning of the test-piece 11, the latter comprising a hole 36 reserved for the passage of the screw.

The head roller 10 is supported by a notched member 37 in which is secured the head of the test-piece by means of three small screws 38. The automatic stopping device is constituted by a rocking lever 39 having a horizontal pivot 40 one end 41 of which can act on a switch 42 controlling the operation of the motor 1 and the other end 43 of which is engaged above a yoke 44 hooked on the spindle 45 of roller 10 and constantly urged upwardly by a weak draw-spring 46.

Figure 4:
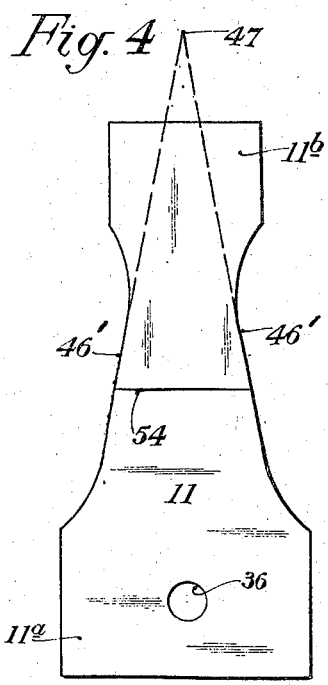
Fig. 4 shows, on an enlarged scale, a test-piece.

The test-piece 11 shown in Fig. 4 comprises a central part laterally limited by the two sides $46^1$ of an isosceles triangle the apex 47 of which must theoretically fall on the axis of the head roller, in order that the rate of operation of which should be constant; but experience has shown that said axis must in fact fall a few millimeters lower.

Said test-piece comprises a flared foot 11a and a flared head 11b, in order to allow the securing in position of the jaws 33, 34 on the one hand and of the notched member 37 supporting the roller 10, on the other hand.

After having thus measured the deviations which must be given to the head of test-piece so that it should be subjected to the desired stresses, the head of the test-piece 11 is placed in the fork-piece 9 of the beam 5 and slight jerks are imparted to the latter. The resiliency of the test-piece always restores it to the same position. The zero of index 7 is then caused to coincide with that of plate 8 by displacing the latter laterally to the required amount. The head of the test-piece is removed from the fork-piece and the beam 5 is inclined sufficiently so that sleeve 26 of connecting-rod 4 can be screwed again. The nut holding the eccentric stationary is unscrewed. The crank-plate being then placed so that the beam is at its maximum amplitude, the absolute value of said amplitude is adjusted by means of sleeve 26 of the connecting-rod 4. The plate is caused to pivot through 180° and the absolute value of the new amplitude is adjusted, partly by means of the sleeve 26 of the connecting-rod, partly by means of the square-headed screw 23. The first position is resumed and checking is effected to see if the absolute value of the maximum amplitude has not varied. In the reverse case, the operation is begun over again as many times as is necessary for the two amplitudes to be adjusted at their values. The sleeve 26 is then locked in position by means of the two lock-nuts 27, 28 and the eccentric by means of the corresponding nut.

The head of the test-piece 11 is replaced in the fork-piece of the beam, the small spring 46 is hooked in position, the automatic stop device is replaced in position, the revolution counter is restored to zero and the motor is set in action.

For avoiding that the beam should exert on the test-piece flexure stresses other than those the effects of which are to be studied, a very small clearance must be left between the roller and the edges of the fork-piece, sufficient for the roller not to become wedged, and sufficiently small for no beating to take place at each change in direction of the movement.

For allowing the test-piece to be subjected to alternate distortions according to a law other than the pure sinusoidal law, it is necessary to modify the simple machine which has just been described, by adding thereto members which impart to the test-piece a supplementary movement which is superposed on the preceding one.

Figure 5:
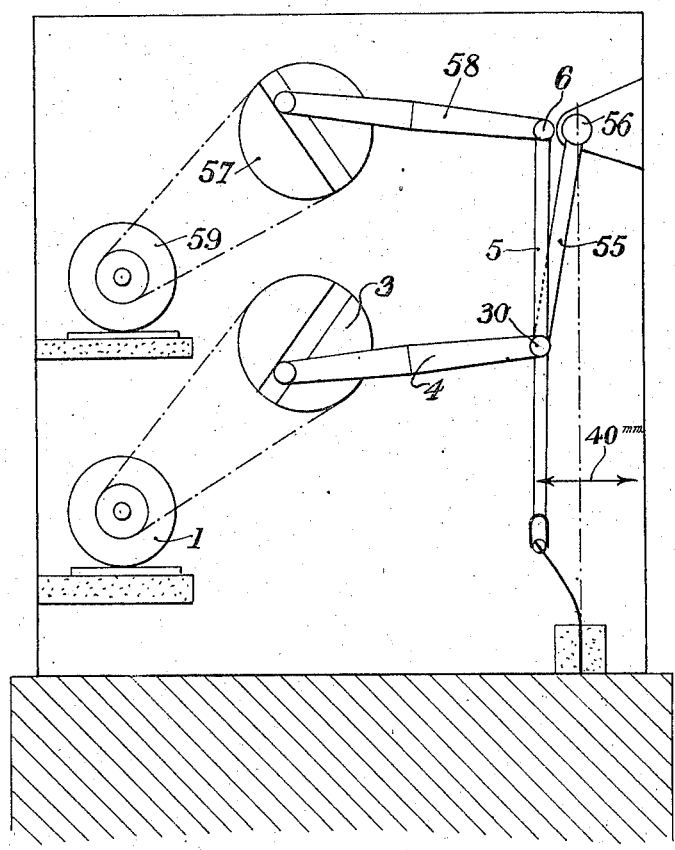
Fig. 5 is a diagram of the principle of a double-acting machine.

For that purpose the double machine diagrammatically illustrated in Fig. 5 is devised, in which, according to the invention, instead of hanging the beam 5 from a fixed pivot 6, it is hung by its pivot 30 from a fork-piece 55 which oscillates in its turn about a pivot 56 geometrically coinciding with pivot 6, and the beam 5 is weighted at its lower part so that, in the position of equilibrium thereof it is hung from pivot 56 by fork-piece 55 and pivot 30. A second crank-connecting-rod system 57, 58, identical to the crank-connecting-rod system 3, 4 is then arranged at the upper part of the machine by connecting the connecting-rod 58 to the pivot 6 as the connecting-rod 4 is connected to pivot 30, and a movement of rotation is imparted to plate 57 by means of an independent electric motor 59. If the motor 59 is stationary the double machine thus obtained behaves exactly as the simple machine already described. If, on the contrary, it is motor 1 which is stationary, electric motor 59 transmits to the beam, and consequently, to the test-piece a pure sinusoidal movement, by the test-piece oscillating about axis 30 which then becomes the fixed point of beam 5. If both motors 1 and 59 rotate simultaneously, the two movements will be superposed and impart to the test-piece distortions which follow a definite law on the one hand by the respective eccentricities of the crank-connecting-rod systems 3, 4 and 57, 58, and on the other hand by the respective periods, or speeds of rotation of these two crank-connecting-rod systems.

If it is desired to impart to the test-piece a uniform movement of normal amplitude, with superposition of overloads acting spasmodically, one of the crank-connecting-rod systems, system 57, 58 for instance, is replaced by a cam of suitable profile against which the corresponding pivot of the beam, pivot 6 for instance is, directly or not, constantly pressed by a suitable spring. At each passage of the boss of the cam, beam 5 receives a supplementary impulse which imposes on the test-piece the required overload, if the profile of the cam has been suitably traced.

It is obvious that crank 57 and connecting-rod 58 respectively of Fig. 5, shown only diagrammatically will have a similar construction to crank 3 and connecting rod 4 shown in detail in Fig. 2, and that they will be adjustable in the same way by eccentric and longitudinal displacement to vary the amplitude of movement. Similarly, beam 5 of Fig. 5 may obviously be provided with an index 7 cooperating with a graduation 8 as shown in Figs. 2 and 3.

Finally, the length of connecting-rods 4 and 58 can be acted upon during the operation, by replacing them by pivoted systems and by acting on the pivotal points, but the preceding solutions appear to be much more simple.

In the case in which said machine is intended to be used for testing by alternate flexure non metallic materials, such as wood and plastic materials or synthetic resins, it is completed by the adjunction of vertically adjustable jaws replacing the fixed jaws previously used. The adjustment can be effected by means of a slide-block provided in the frame of the apparatus and the whole held stationary by two screws receiving nuts and lock-nuts. The clamp secured at the upper part of the test-piece will be widened in order to receive plates the thickness of which may reach 1 cm. The frame of the machine will have larger dimensions. All the other devices will be similar to those previously indicated.

It is to be understood that the embodiments of the machine according to the invention which have just been described are only intended to illustrate the manner in which it can be constructed simply and practically, but the construction thereof can be modified to a large extent without departing thereby from the scope of the invention.

What I claim as my invention and desire to secure by Letters Patent is:

1. A machine for testing materials constrained to alternate flexure comprising jaw members adapted to grip firmly one end of a test-piece, a motor, a crank plate of variable eccentricity, means connecting said motor with said crank-plate to rotate the latter, a beam oscillatable about an axis parallel to the axis of flexure of the test-piece and provided with a bifurcated portion on one side of said axis of oscillation, a longitudinally adjustable connecting rod connecting said crank plate with a point of said beam on the other side of said axis of oscillation, a member secured to the free end of the test-piece, a spindle supported in said member, a roller rotatable on said spindle, bifurcated portion of said beam engaging said roller, and a device for comparing the amplitude of displacement of the free end of said test-piece with that of the displacement caused by a stress of definite intensity, said device comprising a scale member and an indicating member, one of said members being fixed and the other of said members being movable with said beam.

2. A machine as claimed in claim 1 having means for automatically stopping the motor upon breakage of the test-piece comprising a switch controlling said motor, a spring urging said member secured to the free end of the test-piece in an upward direction, a rocking lever having one arm positioned to be engaged by said member when moved upwardly, the other end of said rocking lever being positioned to actuate said switch.

3. A machine for testing materials constrained to alternate flexure comprising jaw members adapted to grip firmly one end of a test-piece, a first motor, a first crank plate of variable eccentricity, means for connecting said first motor with said first crank plate to rotate the latter, a beam oscillatable about an axis parallel to the axis of flexure of said test-piece and provided with a bifurcated portion on one side of said axis, a longitudinally adjustable connecting rod connecting said first crank plate to a point of said beam coinciding with said axis of oscillation, an arm pivotal about an axis parallel to the axis of flexure of the test-piece and supporting said beam at a point vertically above the point of connection of said connecting rod and beam, a second motor, a second crank plate of variable eccentricity, means for connecting said second motor with said second crank plate to rotate the latter and a second longitudinally adjustable connecting rod connecting said second crank plate to a point of said beam on the other side of said axis of oscillation, and a device for comparing the amplitude of the displacements of the free end of the test-piece with that of the displacement caused by a stress of definite intensity, said device comprising a scale member and an indicating member, one of said members being fixed and the other of said members being movable with said beam.

4. A machine as claimed in claim 3 comprising a member secured to the free end of said test-piece, a spindle supported in said member, and a roller rotatable on said spindle, the bifurcated portion of said beam engaging said roller with slight play.

ROBERT L'HERMITE.

REFERENCES CITED

The following references are of record in the file of this patent:

UNITED STATES PATENTS

| Number | Name | Date |
|---|---|---|
| 1,163,830 | Kommers | Dec. 14, 1915 |
| 1,458,259 | Wille | June 12, 1923 |
| 1,512,063 | Sproull | Oct. 21, 1924 |
| 1,906,175 | Millet | Apr. 25, 1933 |
| 2,258,276 | Boettler et al. | Oct. 7, 1941 |

FOREIGN PATENTS

| Number | Country | Date |
|---|---|---|
| 512,035 | Great Britain | Aug. 28, 1939 |